(12) United States Patent
Wong

(10) Patent No.: US 6,351,726 B1
(45) Date of Patent: *Feb. 26, 2002

(54) METHOD AND SYSTEM FOR UNAMBIGUOUSLY INPUTTING MULTI-BYTE CHARACTERS INTO A COMPUTER FROM A BRAILLE INPUT DEVICE

(75) Inventor: Peter Kam-Ho Wong, Mercer Island, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/758,672

(22) Filed: Dec. 2, 1996

(51) Int. Cl.[7] .............................. G06F 17/28; G10L 5/00
(52) U.S. Cl. ................................ 704/3; 704/7; 704/271
(58) Field of Search .............................. 704/1, 2, 3, 7, 704/8, 270, 271, 277; 707/535, 536, 530, 531; 341/28; 382/185; 400/109, 109.1, 483; 434/113, 115

(56) References Cited

U.S. PATENT DOCUMENTS

| | | | | |
|---|---|---|---|---|
| 4,850,026 A | * | 7/1989 | Jeng et al. | 382/185 |
| 5,029,084 A | * | 7/1991 | Morohasi et al. | 704/9 |
| 5,050,121 A | * | 9/1991 | Vaughan | 707/542 |
| 5,197,810 A | * | 3/1993 | Zhang et al. | 400/110 |
| 5,317,509 A | * | 5/1994 | Caldwell | 704/9 |
| 5,533,180 A | * | 7/1996 | Zhou et al. | 707/542 |
| 5,802,482 A | * | 9/1998 | Sun | 704/8 |
| 5,918,206 A | * | 6/1999 | Wong et al. | 704/271 |
| 5,938,447 A | * | 8/1999 | Kirksey | 434/169 |

FOREIGN PATENT DOCUMENTS

| | | | | |
|---|---|---|---|---|
| JP | 60200361 | | 10/1985 | ........... G06F/15/20 |
| JP | 60251466 | | 12/1985 | ........... G06F/15/20 |
| JP | 40-3009863 A | * | 1/1991 | |
| JP | 03260687 | | 11/1991 | ........... G09B/21/02 |
| JP | 40-3260687 A | * | 11/1991 | |
| JP | 40-8221034 A | * | 8/1996 | |
| JP | 40-8221246 A | * | 8/1996 | |
| WO | WO 98/25252 | * | 6/1998 | |
| WO | 9825252 A1 | * | 6/1998 | |

OTHER PUBLICATIONS

Mori, Kenichi and Tsutomu Kawada, "From kana to kanji: word processing in Japan," *IEEE Spectrum* 27(8):46–48, Aug. 1990.

Morisaki et al., "XJp System: An International Language Interface for the X Window System," in Proceedings of the ACM Symposium on User Interface Software and Technology, Hilton Head, SC, Nov. 11–13, 1991, pp. 185–193.

* cited by examiner

Primary Examiner—Joseph Thomas
(74) Attorney, Agent, or Firm—Banner & Witcoff, Ltd.

(57) ABSTRACT

An improved recognition system for translating Braille into multi-byte languages is provided that resolves ambiguities in the translation. By resolving ambiguities in the translation, the improved recognition system helps integrate visually-impaired users into the workforce. Such integration is achieved by providing visually-impaired users with both the means to input Braille for translation into a multi-byte language and the means to disambiguate the translation so that it reflects what the user intended. In this manner, the translation accurately reflects the intentions of the user. Furthermore, the translation is actually stored in the computer in the multi-byte language so that both sighted and nonsighted users alike can utilize the translation.

40 Claims, 18 Drawing Sheets

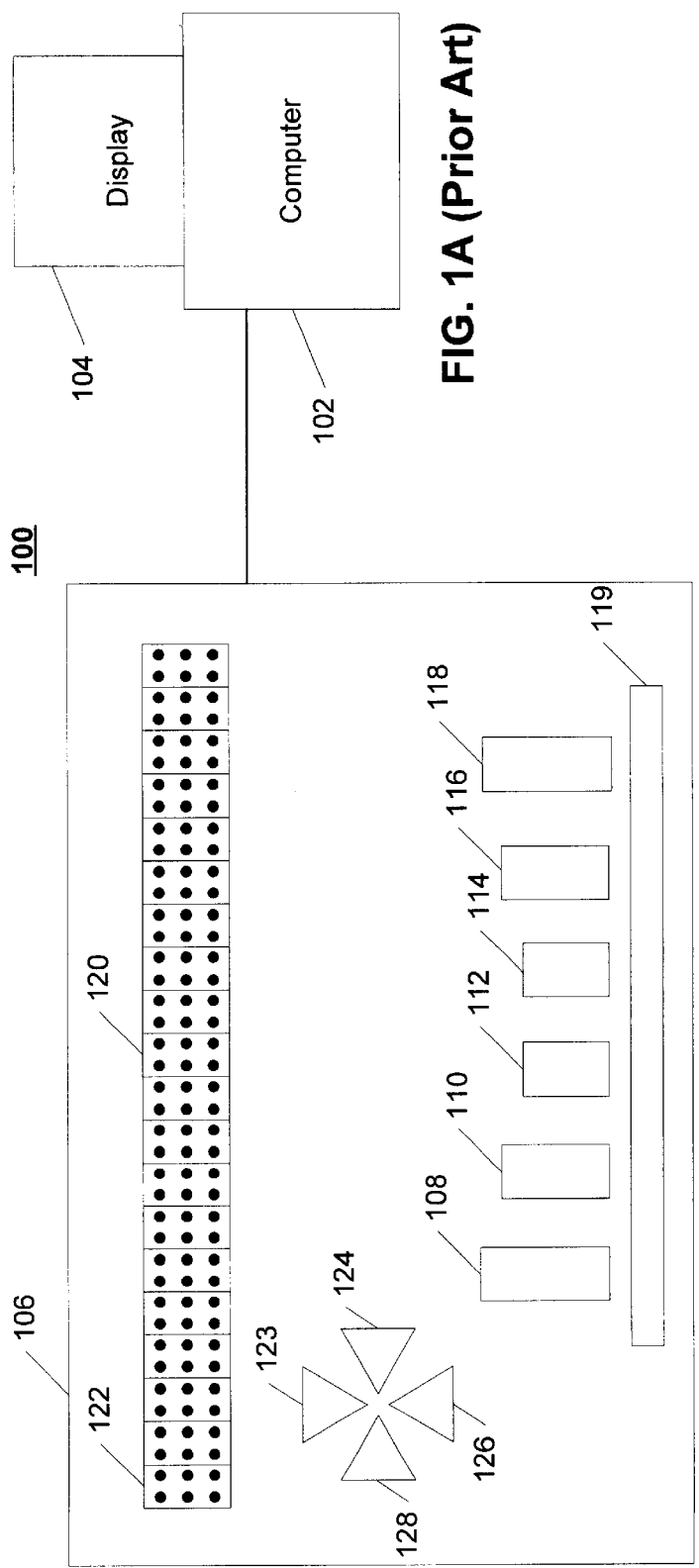
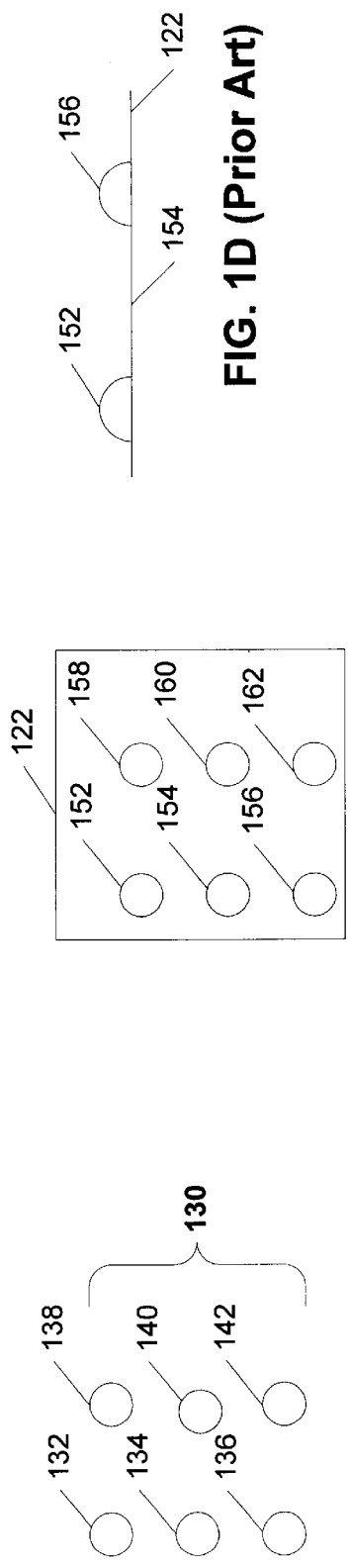
FIG. 1A (Prior Art)
FIG. 1B (Prior Art)
FIG. 1C (Prior Art)
FIG. 1D (Prior Art)
FIG. 1

| Phonetic | Mapping | Consonants |
|---|---|---|
| Braille | Sound | Representation |
| ⠙ | F as in Fay | F |
| ⠂⠐ | H as in Hay | H |
| ⠂ | G as in Gay | K |
| ⠃⠐ | K as in Kay | R |

⠂
⠂

| Phonetic | Mapping | Vowels |
|---|---|---|
| Braille | Sound | Representation |
| ⠃ | a as in ah | B |
| ⠂⠐ | a as in add | T |
| ⠂⠐ | ē as in easy | I |
| ⠣ | ō as in bone | V |
| ⠐⠂ | o as in of | O |
| ⠙⠂ | iy as in sign | % |

⠂
⠂

| Phonetic | Mapping | Tones |
|---|---|---|
| Braille | Sound | Representation |
|  | Default |  |
| ⠂ | Rising tone, similar to question | A |

608 — K8HHAFT"X<'

610 — B@MH, LH1KB

B@MH, LH1KBK8HHAFT"X<'

623 — K8HHAFT"X< '

K8HHA FT"X< '

624 — B@MH, LH1KB

B@MH, LH1KB

625 — B@MH, LH1KBK8HHAFT"X< '

B@MH, LH1KB K8HHA FT"X< '

METHOD AND SYSTEM FOR UNAMBIGUOUSLY INPUTTING MULTI-BYTE CHARACTERS INTO A COMPUTER FROM A BRAILLE INPUT DEVICE

TECHNICAL FIELD

The present invention relates generally to data processing systems and, more particularly, to a method and system for unambiguously inputting multi-byte characters into a computer from a Braille input device.

BACKGROUND OF THE INVENTION

Nonsighted or visually-impaired people have had difficulty in being integrated into the workforce due in part to the difficulty of working with computers to perform such tasks as word processing. In order to integrate visually-impaired people into the workforce, conventional systems have been developed that receive Braille input, store it into a computer, and output it to the user.

One such conventional system 100 for inputting Braille into a computer is depicted in FIG. 1A. The Braille system 100 comprises a computer 102 with a video display 104 and with a Braille I/O device 106. The Braille I/O device 106 is responsible for inputting Braille to the computer 102 via input keys 108–119 and for outputting Braille to the user via the output array 120. As shown in FIG. 1B, each unit of Braille 130 is expressed as a Braille cell having six predefined locations 132–142. Information is conveyed using a Braille cell through the presence or absence of an elevation at the predefined locations 132–142. For example, when Braille is conveyed on a paper medium, a punch behind the paper causes the paper to be elevated at one or more of the predefined locations 132–142. It is the elevations and the absence of elevations at the predefined locations 132–142 that convey meaning to the reader. The depression of the input keys 108–118 causes the computer 102 to receive a signal that a corresponding location 132–142 should be construed to be in an elevated position. Input keys 112, 110, 108, 114, 116, and 118 correspond to predefined locations 132, 134, 136, 138, 140, and 142, respectively. Input key 119 is a space bar which is used to indicate that none of the predefined locations have an elevation. Therefore, by using keys 108–118, a visually-impaired user can input information into the computer 102.

The output array 120 contains 20 output units (e.g., 122), where each output unit can output one Braille cell. As shown in FIG. 1C, each output unit (e.g., 122) contains six apertures 152–162, which correspond to the predefined locations 132–142 of a Braille cell 130, through which the system can provide a protrusion that is perceptible to the human touch. FIG. 1D depicts a left side elevational view of output unit 122 and further shows apertures 124 and 128 with a protrusion and aperture 126 without a protrusion. In this manner, the Braille system 100 can output up to twenty individual units of Braille (Braille cells) via the output array 120.

In order to read information from the video display 104, the user uses the arrow keys 122–128 in conjunction with the output array 120. The arrow keys 122–128 manipulate a reference cursor on the video display 104. The reference cursor highlights information on the video display 104 that is then output to the output array 120. For example, if the reference cursor were at the top of a document, the user could depress arrow key 126 to move down a line so that the user could read a line of information by feeling the output array 120. Similarly, the depression of arrow key 124 moves the reference cursor to the right, the depression of arrow key 128 moves the reference cursor to the left, and the depression of arrow key 122 moves the reference cursor up. By using the Braille system 100, a visually-impaired user is able to store Braille information onto the computer 102 and read Braille information from the computer.

When the Braille system 100 is used with the English language, the user can exactly indicate an English language expression because each Braille cell corresponds to exactly one letter of the English language. Therefore, the user can input one letter at a time and can read the output one letter at a time. However, such Braille systems are significantly less helpful when used with multi-byte languages. A "multi-byte language" is a language in which more than one byte is needed to uniquely identify each character of the language. In other words, there are more than $2^8$ (or 256) characters in the language. The characters of a multi-byte language are referred to as multi-byte characters. Multi-byte languages, such as Kanji-based languages like Chinese, Japanese, and Korean, have approximately 40,000 characters.

In Kanji-based languages, the elements of grammar are known as "Kanji characters." The phrase "elements of grammar" refers to units of a given natural language that are capable of comprising parts of speech. For example, the elements of grammar in the English language are words. As such, each Kanji character is a higher-order linguistic symbol that is analogous to a word in the English language. That is, natural languages tend to have three levels of linguistic elements. The lowest of these levels depends on the specific alphabet used and is associated with the sounds of the spoken language. For example, the first and lowest level of linguistic elements in the English language comprises letters. The third level of linguistic elements is the highest level and contains those linguistic elements conveying full creative expression. In the English language, the third level comprises sentences. It is the second level of linguistic elements to which the phrase "elements of grammar" refers. This second level is an intermediate level of linguistic elements and, in the English language, the second level comprises words. In Chinese, the second level comprises Kanji characters.

Because there are approximately 40,000 Kanji characters in Kanji-based languages and only $2^6$ (or 64) characters can be uniquely identified by one Braille cell, well-known systems have been devised to map individual Braille cells onto the phonetics of the multi-byte language. The phonetics, usually three, are then combined to identify an intended character, although the identification is inexact. The intended character is inexactly identified because many different characters sound alike, but have different meanings. For example, the following Chinese characters all sound like "wong" and thus are identified using the same Braille input, but each character has a different meaning:黃王皇蝗偟

Because many characters sound alike in multi-byte languages, when using Braille to input and output multi-byte characters, there is an inherent problem of ambiguity.

FIG. 2 depicts a well-known phonetic mapping scheme for mapping Braille onto the phonetics of the Chinese language spoken in the Cantonese dialect. This phonetic mapping scheme groups all phonetics into three categories: consonants, vowels, and tones. A number of Braille cells are defined to indicate specific consonants, some of which are depicted in Table 202. Table 202 indicates a specific Braille representation, such as ":·", that corresponds to a particular consonant, such as "F as in Fay," and indicates the particular representation stored in the computer (e.g., "F"). In this example, when a user inputs ":·" via the Braille I/O device, they intend the consonant "F as in Fay." The Braille I/O device sends the input to the computer where it is stored as an F character to indicate the particular Braille input and the phonetic represented by it. Using this system, some sounds have representations in the computer that do not correspond with the sound. For instance, although the sound for Braille input ":·" is "G as in Gay," the representation in the computer is "K."

Table 204 contains some sample phonetic mappings of vowels, where the Braille input corresponding to the specific sound and its representation within the computer are depicted. For example, the Braille input ":·" corresponds to the vowel "iy as in sight," and is represented in the computer as "%." Likewise, Table 206 depicts the phonetic mapping of various tones. One of these tones is the default tone which is specified by the absence of a Braille cell. Another of the tones is the rising tone, which is similar to the tone used when the speaker wishes to indicate a question. Using this phonetic mapping scheme for mapping Braille onto Cantonese phonetics, a user specifies a specific Kanji character by using usually three Braille cells: one for the consonant, one for the vowel, and one for the tone. In some situations, the user may omit the Braille cell for the tone to indicate that the default tone is desired.

When the Braille system 100 is used with the phonetic mapping scheme described above, the user inputs the Braille into the computer and the computer stores the phonetic representation (e.g., w;' which is the computer representation of the phonetics for characters that sound like "wong") and not the actual multi-byte character. Storing the data by its phonetic representation prevents the data from being used by a sighted user that does not understand these cryptic symbols and, therefore, does little to integrate the visually impaired into the workforce. Another problem with this system is that since the phonetics are mapped onto the characters of the multi-byte language, the Braille does not exactly map to a specific character, because many characters have the same sound but mean completely different things. As such, there is a significant amount of ambiguity which poses a problem. Such ambiguity problems must be overcome to facilitate the use of computers by the visually-impaired. Therefore, it is desirable to improve Braille input systems for multi-byte languages to resolve ambiguities.

SUMMARY OF THE INVENTION

An improved recognition system for translating Braille into multi-byte languages is provided that resolves ambiguities in the translation. By resolving ambiguities in the translation, the improved recognition system helps integrate visually-impaired users into the workforce. Such integration is achieved by providing visually-impaired users with both the means to input Braille for translation into a multi-byte language and the means to disambiguate the translation so that it reflects what the user intended. In this manner, the translation accurately reflects the intentions of the user. Furthermore, the translation is actually stored in the computer in the multi-byte language so that both sighted and nonsighted users alike can utilize the translation.

In accordance with a first aspect of the present invention, a method is provided for translating Braille input into characters of a multi-byte language in a computer system having the Braille input and having a database of entries containing mappings of Braille to phrases containing at least one character of the multi-byte language. In accordance with the first aspect, the method attempts to match the Braille input to at least one of the entries in the database to translate the Braille input into the multi-byte language. When the Braille input does not match at least one of the entries, the method reduces the Braille input by an amount sufficient to represent a character and attempts to match the reduced Braille input to at least one of the entries in the database. When the reduced Braille input does not match at least one of the entries in the database, the method repeatedly reduces the Braille input and attempts a match until the reduced Braille input matches at least one of the entries in the database to translate the reduced Braille input into the multi-byte language.

In accordance with a second aspect of the present invention, a method is provided for translating input containing portions into characters of a multi-byte language in a computer system. A portion of the input corresponds to a plurality of characters where only a single intended character is intended by a user to be identified by the portion. In accordance with the second aspect, the method receives the input for translation into the multi-byte language where the input contains a user-specified indication of a portion that corresponds to a plurality of characters. The method also utilizes the user-specified indication to unambiguously translate the portion into the single intended character.

In accordance with a third aspect of the present invention, a method is provided for translating input in a first language into a second language in a computer system having a database with entries containing mappings of portions of the input onto phrases of the second language. In accordance with the third aspect, the method receives the input for translation, translates the input into the second language by matching the portions of the input against the database entries to identify matching phrases, and outputs the matching phrases such that a user can discern a distinctness of each matching phrase to facilitate detection of translation errors.

In accordance with a fourth aspect of the present invention, a method is provided for translating phonic data representing spoken sounds of a language into text of the language in a computer system having a database with entries containing mappings of phonic data onto phrases of the text. The method receives portions of the phonic data and translates the phonic data to text by mapping the received portions of the phonic data to the phrases in the database entries.

In accordance with a fifth aspect of the present invention, a method for translating Braille input into characters of a multi-byte language in a computer system is provided. The method receives the Braille input, translates the Braille input into text of the multi-byte language, and stores the text into the computer such that the text is represented as individual characters of the multi-byte language so that the text is understandable to a user that understands the characters of the multi-byte language, but does not understand Braille.

In accordance with a sixth aspect of the present invention, a method is provided for translating input having elements of grammar from a first form into a second form in a computer system. The method receives input in the first form, translates the input into the second form to create translated elements of grammar, and outputs usages of the translated elements of grammar in the second form so that a user can identify translation errors.

In accordance with a seventh aspect of the present invention, a method is provided for phonetically inputting data into a computer system. The method receives input comprising groups of phonetics representing sounds made when a language is spoken where a group of phonetics corresponds to at least one element of grammar of the language. For each of the groups in the received input, the method identifies at least one element of grammar that corresponds to the group of phonetics and outputs usages of the identified element of grammar so that a user can determine if the identified element of grammar is an intended element of grammar.

BRIEF DESCRIPTION OF THE DRAWINGS

FIG. 1A depicts a conventional system for inputting Braille into a computer.

FIG. 1B depicts a Braille cell.

FIG. 1C depicts an enlarged top plan view of an output unit of the conventional system for inputting Braille of FIG. 1A.

FIG. 1D depicts a left-side elevational view of the output unit of FIG. 1C.

FIG. 2 depicts a conventional phonetic mapping scheme for mapping Braille onto the phonetics of the Cantonese dialect of Chinese.

FIG. 6A depicts an example of input to the recognizer program.

FIG. 6C depicts an example of phrases recognized by the recognizer program.

FIGS. 6E–6H depict a list of phonetically-equivalent characters displayed by the recognizer program.

FIG. 6I depicts usages of a replaced character displayed by the recognizer program.

DETAILED DESCRIPTION OF THE INVENTION

Figure 3:
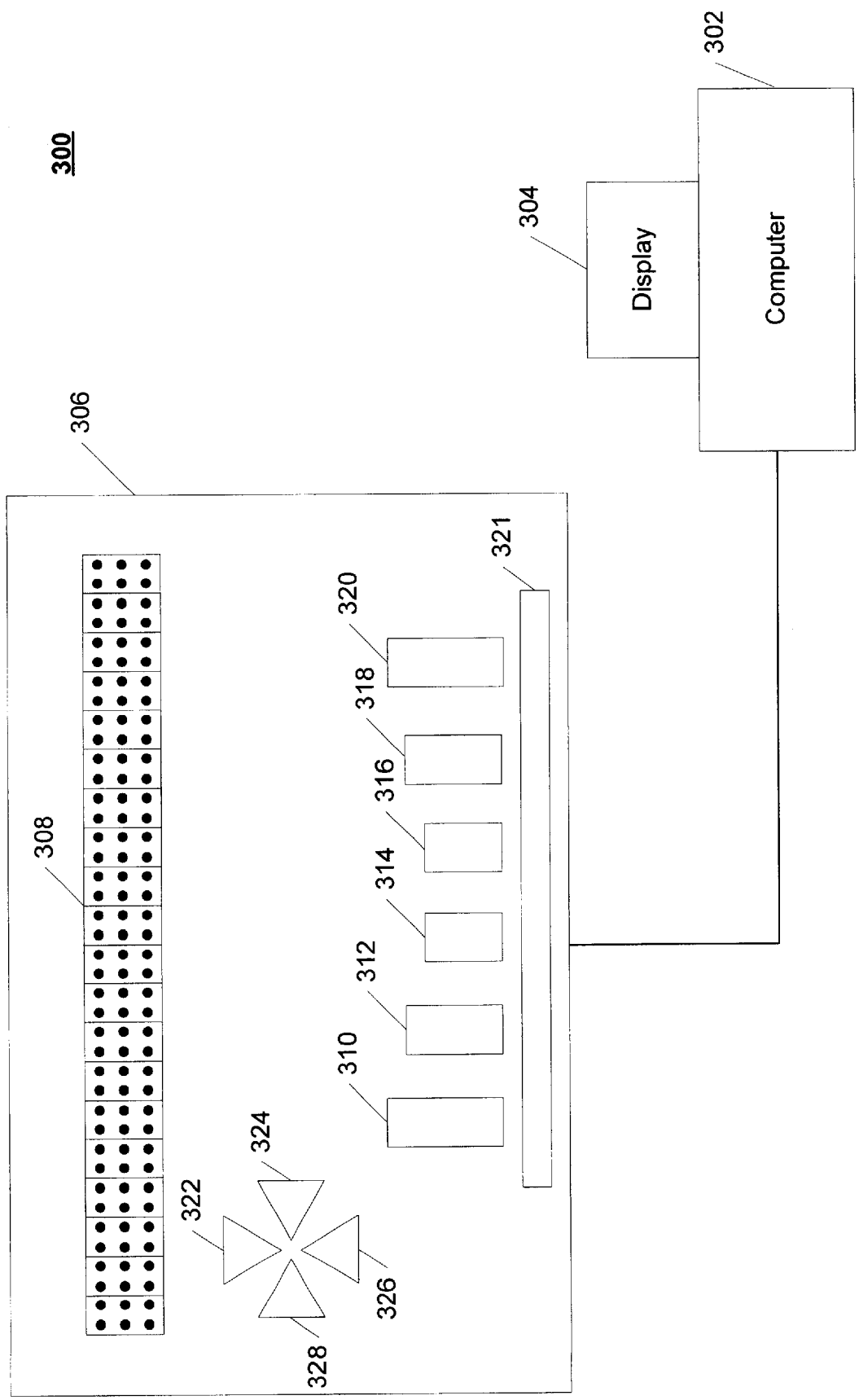
FIG. 3 depicts a Braille system that is suitable for practicing a preferred embodiment of the present invention.

An improved recognition system for translating Braille into multi-byte languages is provided that resolves ambiguities in the translation. By resolving ambiguities in the translation, the improved recognition system helps integrate visually-impaired users into the workforce. Such integration is achieved by providing visually-impaired users with both the means to input Braille for translation into a multi-byte language and the means to disambiguate the translation so that it reflects what the user intended. In this manner, the translation accurately reflects the intentions of the user. Furthermore, the translation is actually stored in the computer in the multi-byte language so that both sighted and nonsighted users alike can utilize the translation.

Overview

In order to translate Braille input into a multi-byte language, the improved recognition system receives lines of Braille input from the user via a Braille input device. When inputting the Braille, which represents phonetics for characters of the multi-byte language, the improved recognition system allows the user to provide assistance in resolving ambiguities. Specifically, the recognition system allows the user to provide an indication of ambiguous input. For example, if the user does not have confidence that the recognition system will translate some of the phonetics into an intended character, the user may provide usage information, such as additional phonetics representing additional characters that together form a phrase, so that the system can correctly translate the phonetics into the intended character by using the context provided by the phrase.

In response to receiving the lines of input, the recognition system translates the input. The recognition system performs this translation by attempting to match each individual line against entries in a database. The recognition system maintains a database with a number of entries containing mappings of Braille to multi-byte language phrases, such as Chinese phrases. Each phrase contains at least one Kanji character. During the translation, the recognition system first attempts to match one entire line to the database entries. If the line does not match an entry in the database, the recognition system truncates the phonetics for one character from the end of the line and attempts another match. If a match is still not found, the recognition system repeatedly truncates the phonetics for the last character and attempts a match until a matching entry is found. Upon finding a matching entry, the phrase is copied into an output file, and thus the output file contains the phrase in the form of the multi-byte language. After finding the matching entry, if any portion of the line remains untranslated, the rest of the line is translated similarly. In this manner, all of the Braille input is translated into the multi-byte language and stored in the output file as multi-byte characters. The improved recognition system stores the translated data in the form of the multi-byte language so that the data can be utilized by both nonsighted users and sighted users that do not understand Braille or the representation of the character phonetics, which helps integrate nonsighted users into the workforce. Storing the translated data in the form of the multi-byte language is a significant improvement over some conventional systems that store the data using its phonetical representation, which makes the data difficult for sighted users to use.

After the translation process has completed, the recognition system allows the user to proofread the translated text stored in the output file to identify and resolve any ambiguities. This proofreading allows the user to make sure that, although the phonetics for a particular character may match a number of characters, the intended character was chosen by the recognition system. When proofreading the translated text, the phrases that were recognized are displayed such that the user can perceive the distinctness of each phrase. In other words, the translated text is not outputted as a whole; rather, the phrases are outputted separated by spaces so that the user can discern the individuality of each phrase that was recognized by the system. By outputting the phrases so a user can discern their individuality, the amount of proofreading that the user must perform is reduced. That is, the larger the number of characters in a particular phrase, the more confidence the user has that the phrase was translated correctly. Although the chances are fairly good that the phonetics for a single character inexactly indicate the character, the chances of the phonetics for two characters inexactly indicating a pair of two characters is significantly less. Obviously, as the number of characters indicated by the phonetics increases, the chances that the intended characters were exactly identified also increases. Thus, when the user determines that a phrase has been translated having more than a couple of characters, the user can feel confident that the translation was correct. This functionality allows the user to only proofread the phrases in which they are uncertain as to the correctness of the translation, such as phrases containing only a single character. Additionally, when outputting the phrases, the improved recognition system indicates whether the input for a particular phrase matched more than one entry in the database. In this case, the user can instruct the system to output all matching entries for the phrase so that the user can determine if the system chose the correct or intended phrase.

When proofreading the output, the user scans the output, and when the user believes that a phrase may have been incorrectly translated, the recognition system allows the user to examine usages of each character in the phrase. A "usage of a character" refers to a phrase containing the character combined with one or more additional characters. The system outputs usages of a character so that the user can determine whether the correct character was translated by using the context of the phrase. If the user determines that a translation error occurred such that an incorrect character was translated, the recognition system outputs a list of all phonetically-equivalent characters as well as their usages to the user. A "phonetically-equivalent character" is a character that has a similar sound. The user may then scan the list to identify the correct character to be used in the translation. Upon identifying the correct character, the recognition system replaces the character in the phrase in the output file with the correct character. Additionally, if the correct character were part of a phrase of more than one character, the recognition system stores the updated phrase into the database with the corresponding Braille input so as to assist the system in making a correct translation the next time that the system performs such a translation. By using the improved recognition system, visually-impaired users can unambiguously use Braille to input multi-byte characters into a computer.

Although a preferred embodiment is described below with reference to multi-byte character languages, one skilled in the art will appreciate that the present invention can be used with other languages. For example, the present invention may be used with single-byte languages such as English, Spanish, French, and German, where the elements of grammar are words. Additionally, although a preferred embodiment is described relative to Braille input, one skilled in the art will appreciate that the present invention can also be used with voice input. Furthermore, it should be appreciated by one skilled in the art that the techniques described below can be used to output and proofread an existing file containing multi-byte or other characters.

Implementation Details

FIG. 3 depicts a Braille I/O system 300 that is suitable for practicing a preferred embodiment of the present invention. The Braille I/O system 300 contains a computer 302 with a video display 304 and a Braille I/O device 306. The Braille I/O device 306 contains six input keys 310–320, a space bar 321, an output array 308, and four arrow keys 322–328 for manipulating a reference cursor on the video display 304.

Figure 4:
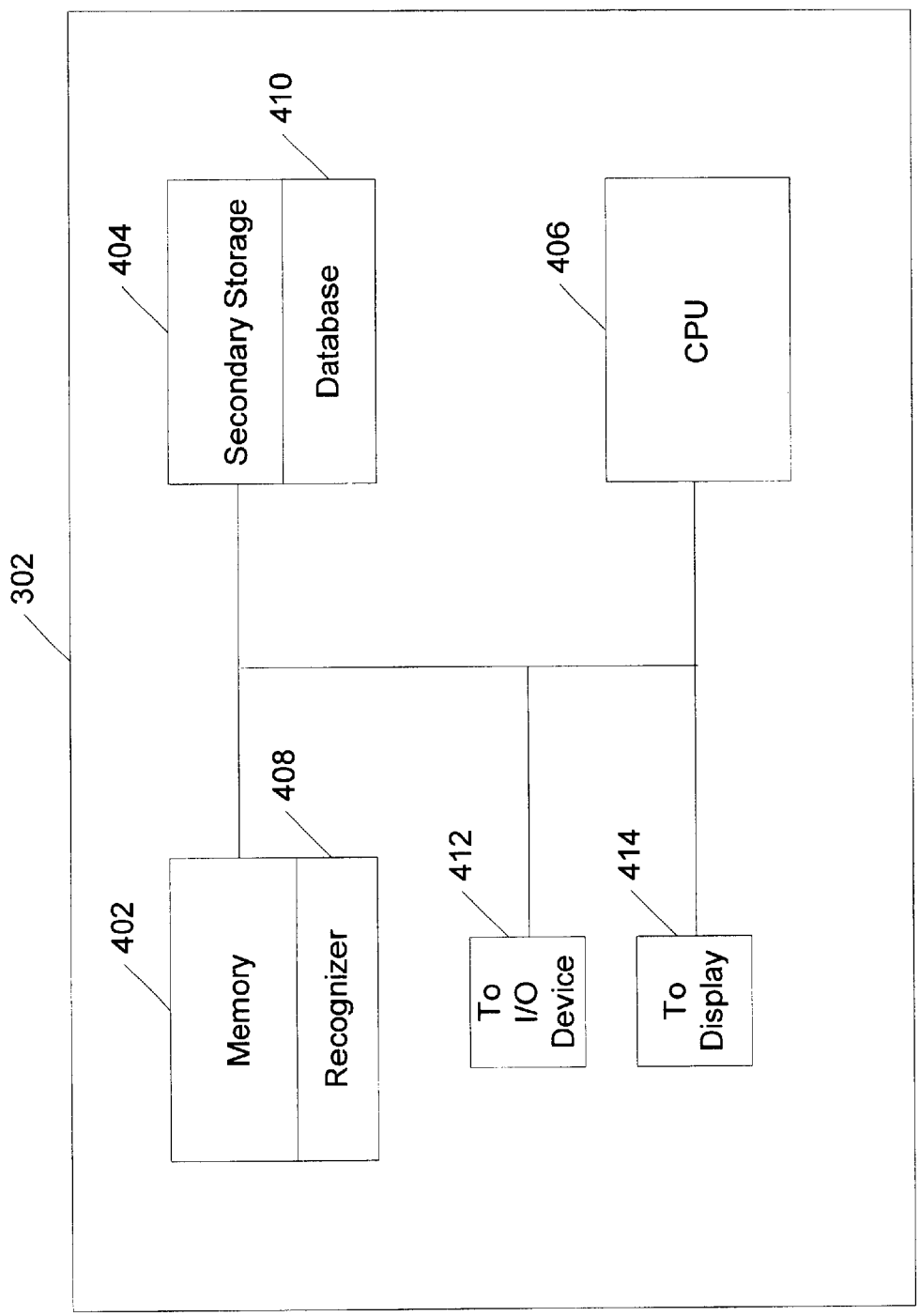
FIG. 4 depicts a more detailed diagram of the computer in the Braille system of FIG. 3.

FIG. 4 depicts a more detailed diagram of the computer 302. The computer 302 contains a memory 402, a secondary storage device 404, a central processing unit (CPU) 406, as well as a connection 412 and 414 to the Braille I/O device and the video display, respectively. The memory 402 contains the recognizer 408, and the secondary storage device 404 contains the database 410. The recognizer 408 is responsible for receiving Braille input from the user via the Braille I/O device 306, mapping the input against the entries in the database 410 to translate the Braille input into a double byte-based language, such as Chinese, and providing the user with the ability to proofread the translation so as to disambiguate the translation. The database 410 contains entries with mappings of Braille onto phrases of at least one Chinese character. Although some examples of the mappings are now provided, one skilled in the art will appreciate that the database may contain thousands of such mappings. For example, the computer representation for the Braille input of the phonetics "wong" is w;'. Thus, the database may contain a mapping of w;' onto the following wong-sounding character:黃

Another example of an entry in the database is a mapping of the representation of the Braille input "B@MH,LH1KB," which means America and in Cantonese sounds like "ah mai lai ka," onto the following Chinese characters:亞美利加

Figure 5A:
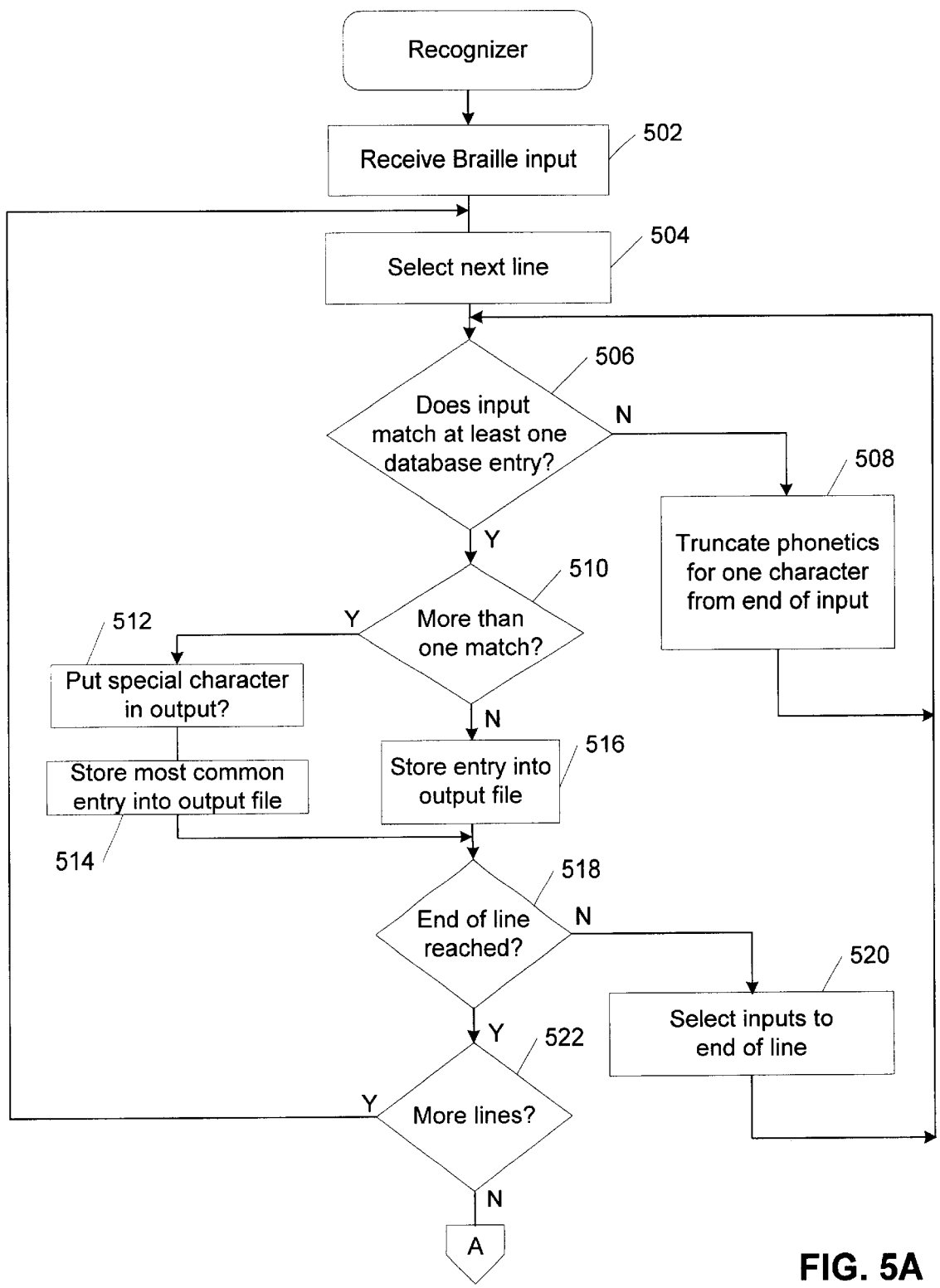
FIGS. 5A–5C depict a flowchart of the steps performed by the recognizer depicted in FIG. 4.
Figure 5B:
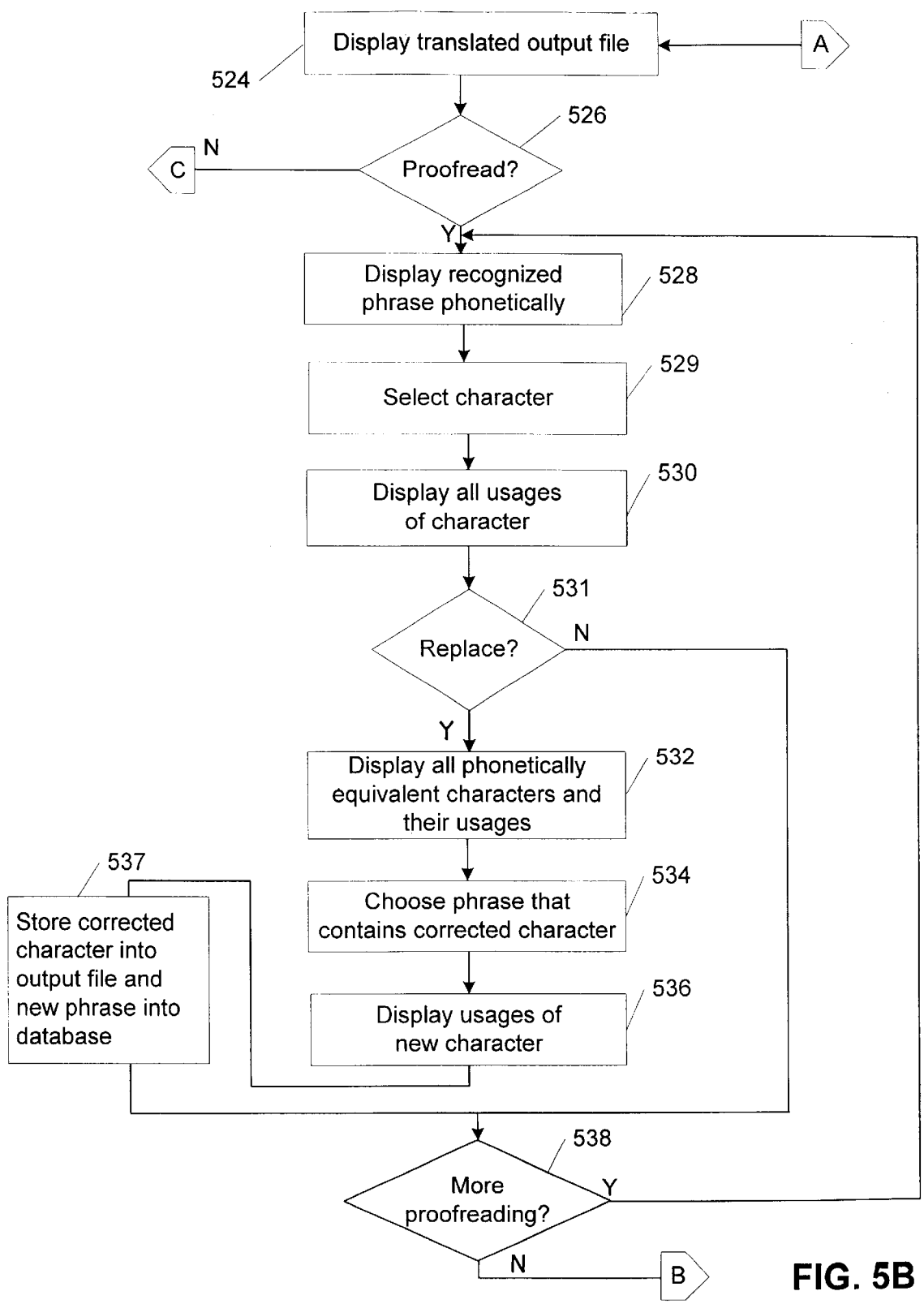
Figure 5C:
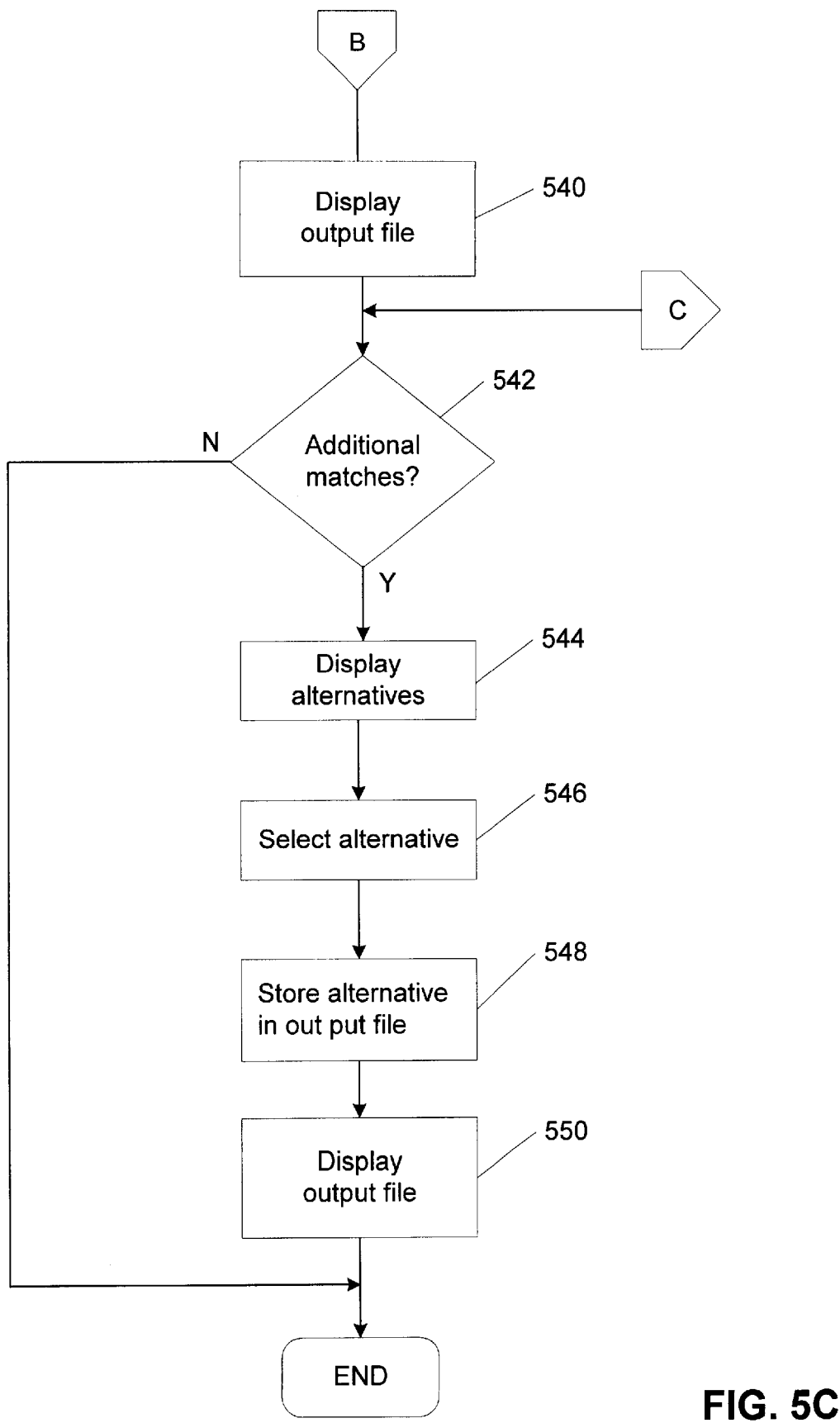

FIGS. 5A–5C depict a flowchart of the steps performed by the recognizer of a preferred embodiment. The first step performed by the recognizer is to receive Braille input from the user via the Braille I/O device (step 502). FIG. 6A depicts sample input received from the Braille I/O device. The sample input contains 5 lines of information 602–610. The first line 602 contains the phonetics that together sound like "wong," which corresponds to a number of different characters in the Cantonese dialect of the Chinese language. Line 604 is an example of a line that contains an indication of a possible ambiguity. As stated above, the improved recognition system allows the user to input an indication so that the translation system correctly translates the indicated Braille. This indication takes the form of special characters such as "a" and "}." For example, line 604 shows that the special character "a" indicates that the following phonetics up until the trailing "}" should be translated into a single character. In this example, a wong-sounding character is being translated. The special characters delineate the phonetics for a number of characters that together provide a usage of the character to be translated so that the system can translate the character correctly from the context. The phonetics of the first character—w;'—sounds like wong, and the phonetics for the second character —)VA—are the phonetics for a character that sounds like toe. Together, all of the phonetics sound like "wong toe," which uniquely identifies only one phrase of two characters meaning "yellow soil." From this phrase, the system can determine the correct wong-sounding character for the translation. If the first special character ("a") were to indicate that the second phonetic were the character to be translated, the special character would be a "b" and so on. Special characters can also be used by the improved recognition system to indicate to the system that an entire phrase should be translated as a whole. This functionality is provided to prevent the situation from occurring where the phrase is translated together with other characters of the input, which may result in a translation error.

Again, with reference to FIG. 6A, line 606 contains the computer representation of the Braille input for four Chinese characters that sound as follows: kong, hay, fat, and choi. This phrase means to wish riches upon someone. Line 608 contains the phonetics for 4 characters: ah, mai, lai, and ka. Together, these 4 characters mean "America." Line 610 contains a combination of lines 608 and 606 with line 608 occurring before line 606.

After receiving the Braille input, the recognizer selects the next line beginning with the first line (step 504). After selecting the next line, the recognizer attempts to match the entire line against the database entries to determine if the input matches at least one database entry (step 506). If the input does not match at least one database entry, the recognizer truncates the phonetics for one character from the end of the input (step 508) and continues to step 506. This processing of steps 506 and 508 continues until a match is made. After a match of the input to a database entry is made, the recognizer determines if the input matched more than one database entry (step 510). If more than one match was made, the recognizer puts a special character into the output file, such as a "z," to indicate that more than one match was made (step 512) and stores the most commonly-used entry of the matching entries into the output file (step 514). In the database entries that map onto the same phonetic input, the system maintains a counter that is incremented each time that the entry is used. In this step, the recognizer accesses the counter to determine which matching entry has been used most often. The most often-used entry is then copied into the output file. If it is determined that more than one match has not been found, the recognizer stores the phrase in the matching entry into the output file (step 516). Based on the processing of steps 514 and 516, the output file contains the translated data in the form of the multi-byte language. Specifically, character codes are stored which uniquely identify the characters of the multi-byte language much like the ASCII code uniquely identifies English letters. A preferred embodiment utilizes the well-known Big 5 character code, although one skilled in the art will appreciate that other character codes like the Unicode character code may be used.

Figure 6B:
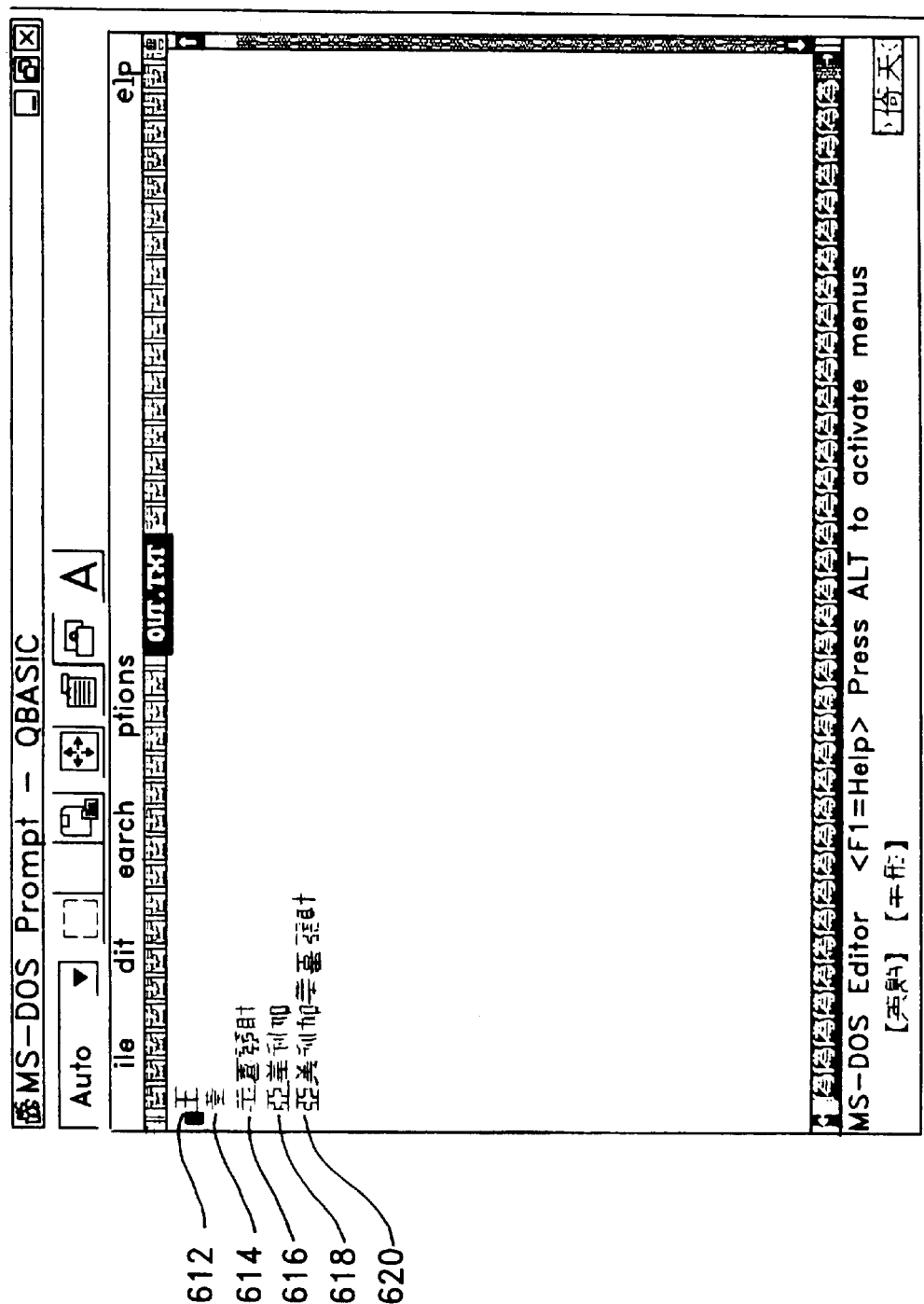
FIG. 6B depicts an example of an output file displayed by the recognizer program.

Next, the recognizer determines if the end of the line has been reached (step 518). If the end of the line has not been reached, the recognizer selects the untranslated text remaining in the line and continues to step 506 to complete the translation. If the end of the line has been reached, the recognizer determines if there are more lines in the input (step 522), and if so, proceeds to step 504. If no more lines are contained in the input, the recognizer displays the translated output file (step 524 in FIG. 5B). FIG. 6B depicts an output file containing lines 612–620 reflecting the input (lines 602–610 of FIG. 6A) after it has been translated. As can be seen from lines 612 and 614 of FIG. 6B, the system has recognized the phonetic for the wong-sounding character of line 602 of FIG. 6A to be the character depicted in line 612, since this is the most commonly used of the wong-sounding characters. However, where the user used the special characters of line 604 in FIG. 6A to unambiguously indicate a different wong-sounding character, the different wong-sounding character was correctly recognized by the system as reflected by line 614.

Figure 6D:
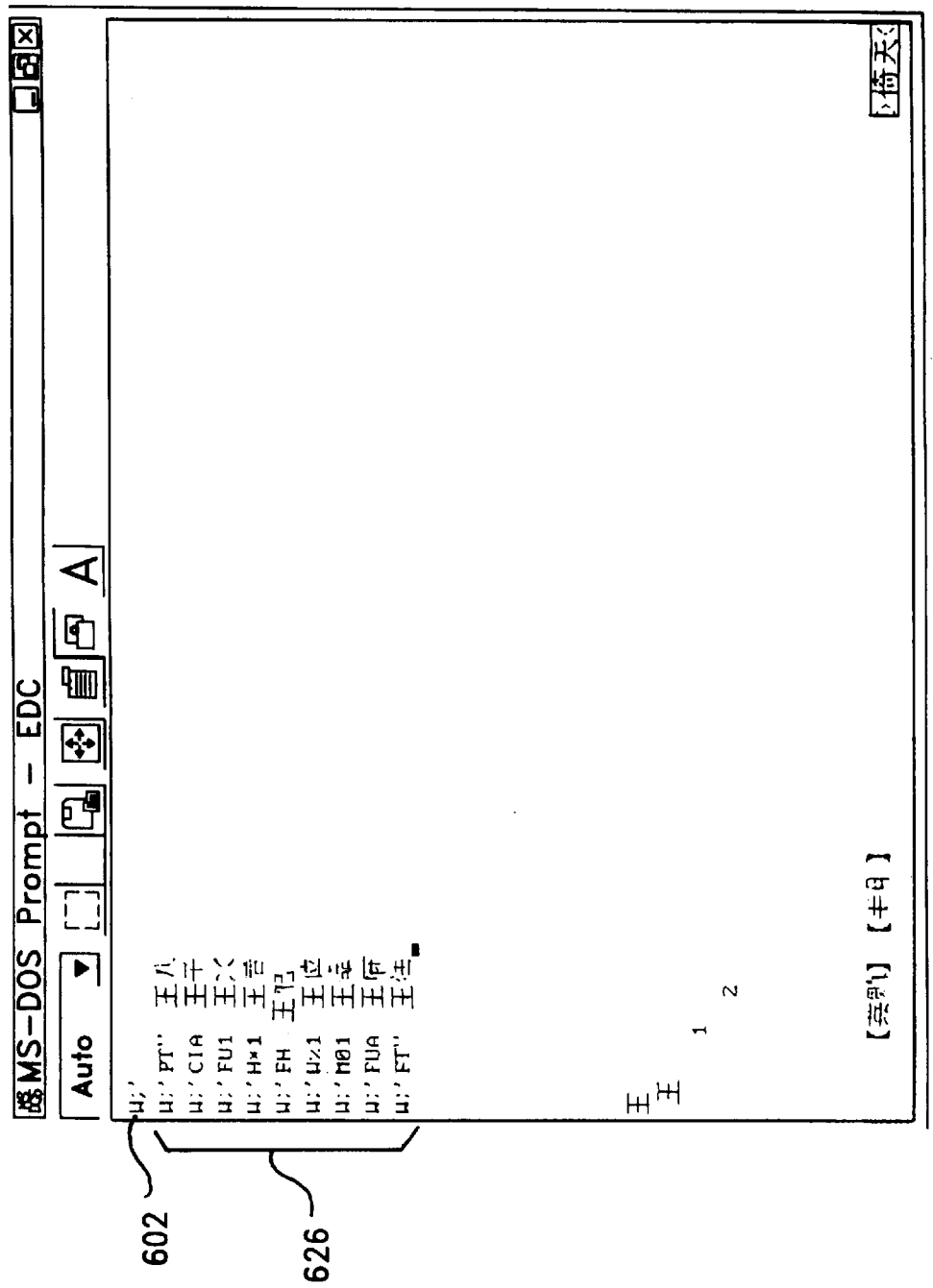
FIG. 6D depicts an example of usages of a character displayed by the recognizer program.
Figure 6E:
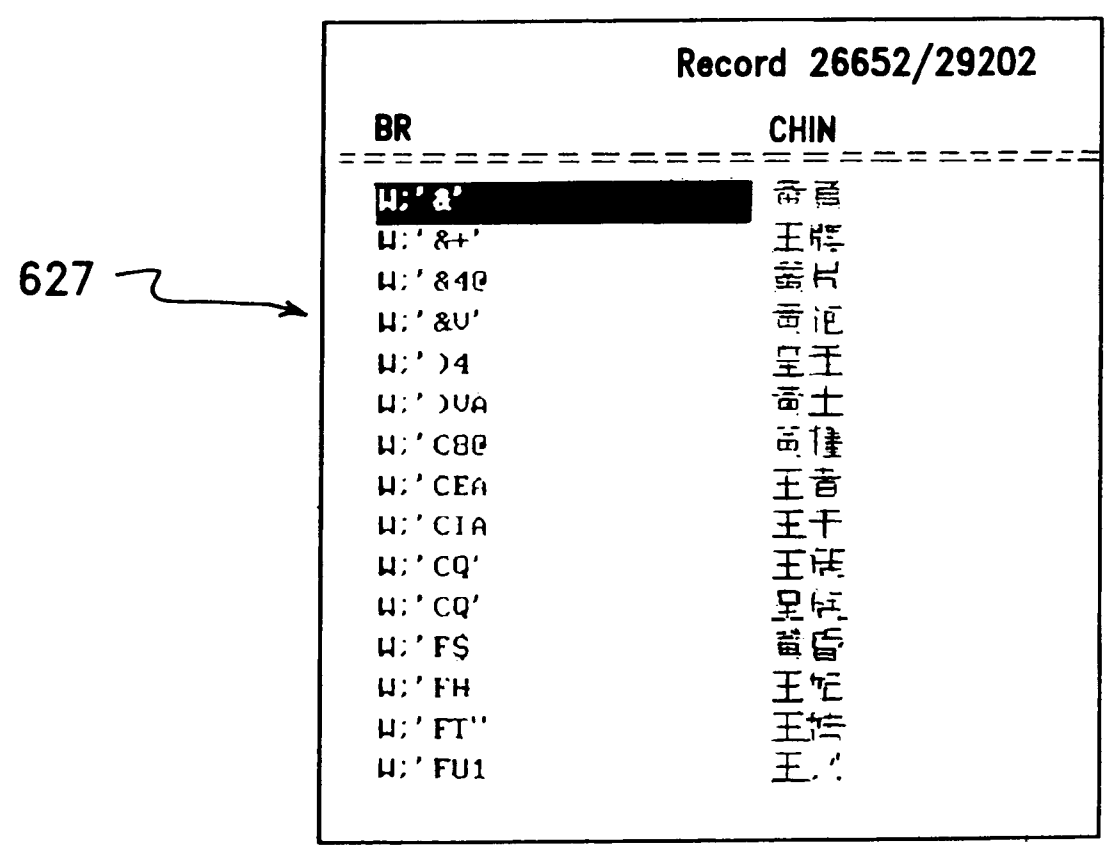
Figure 6F:
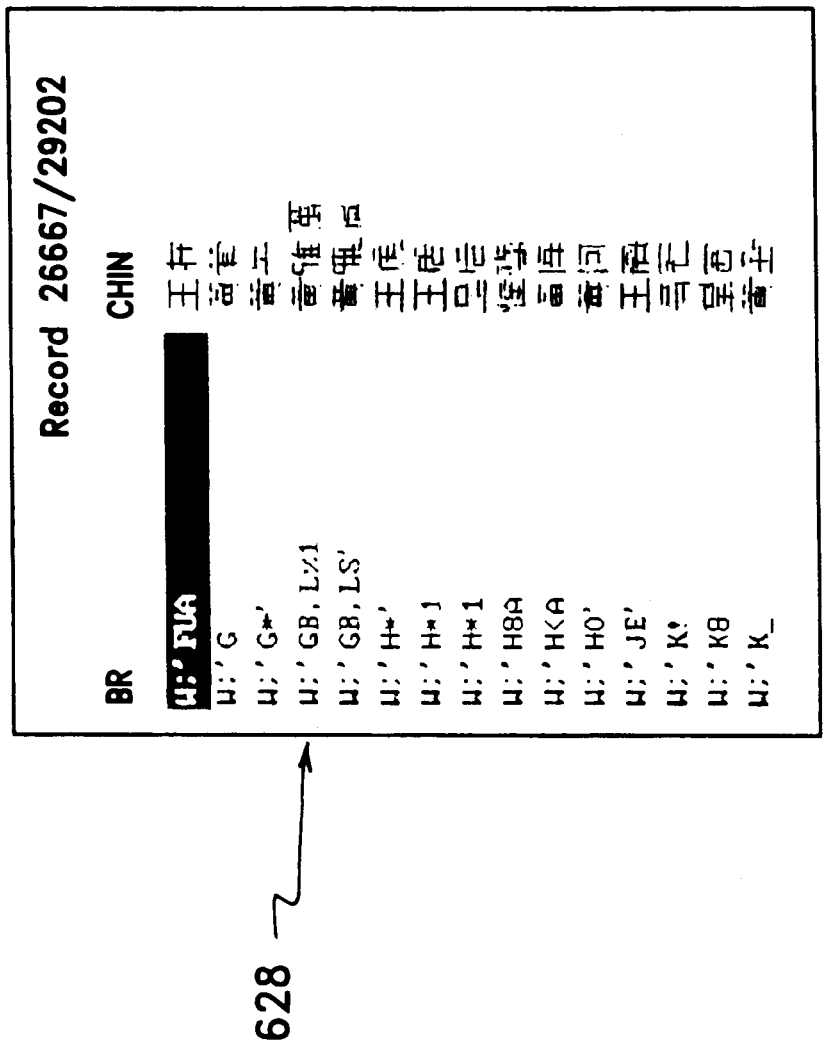
Figure 6G:
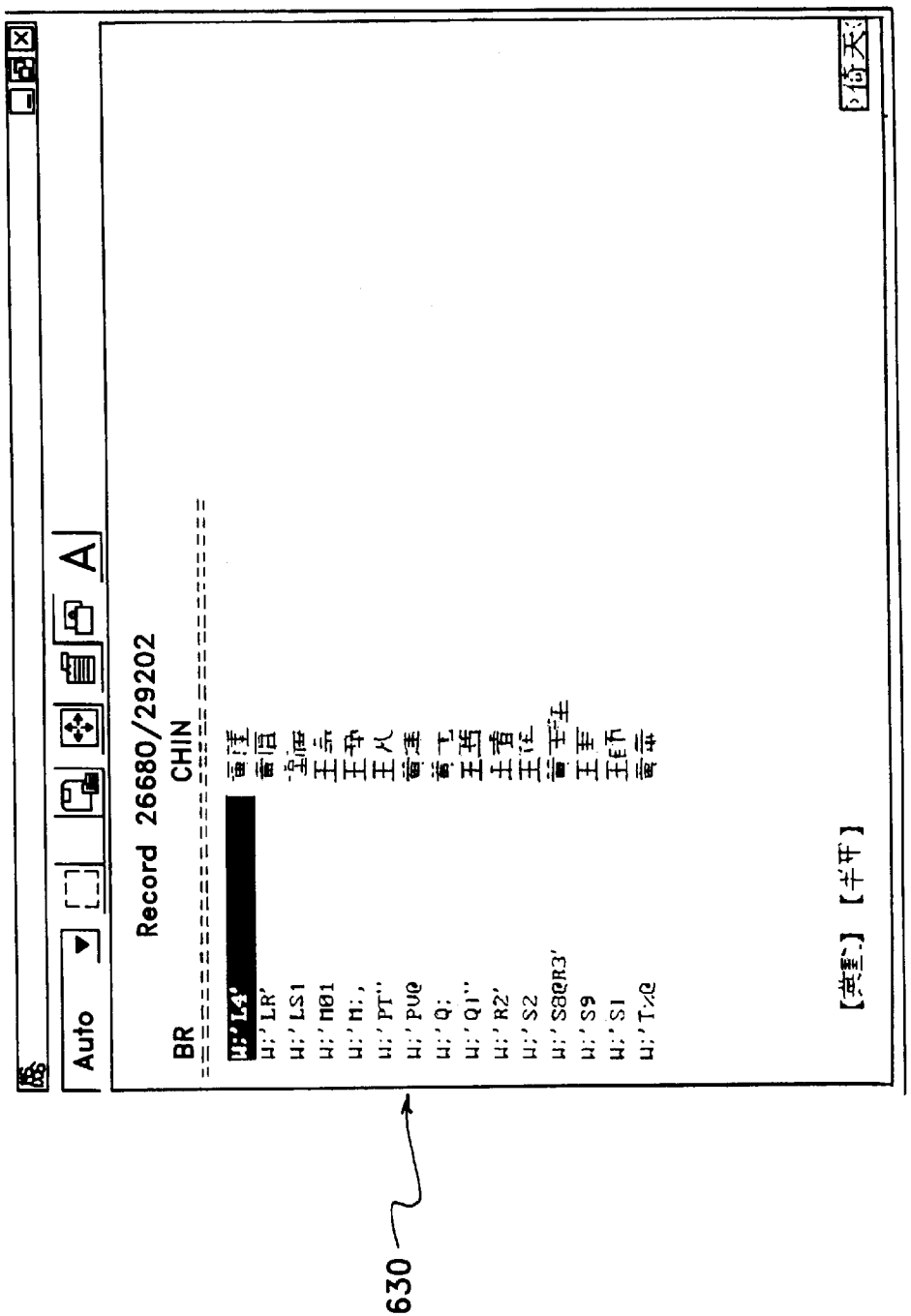
Figure 6H:
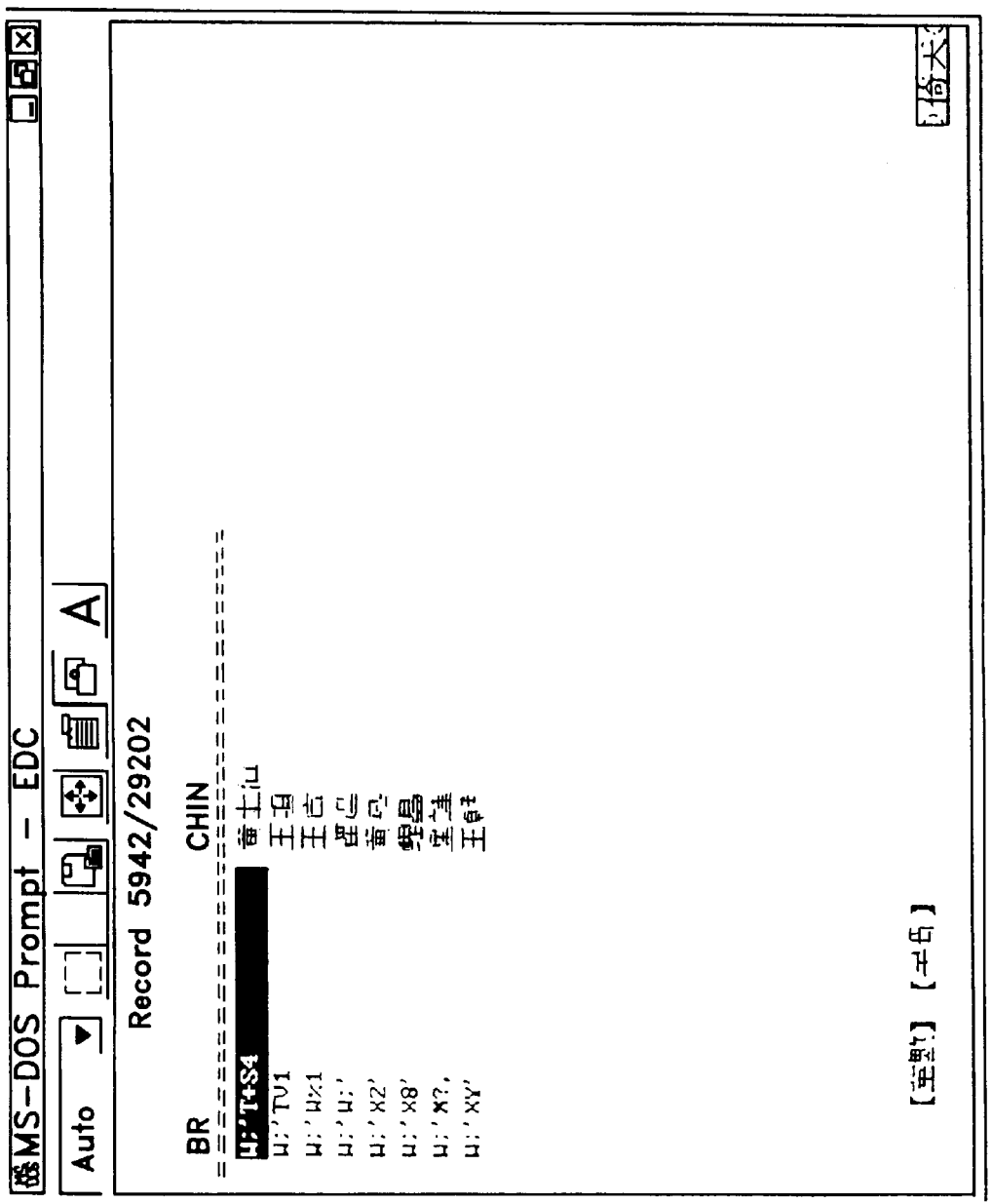
Figure 19:
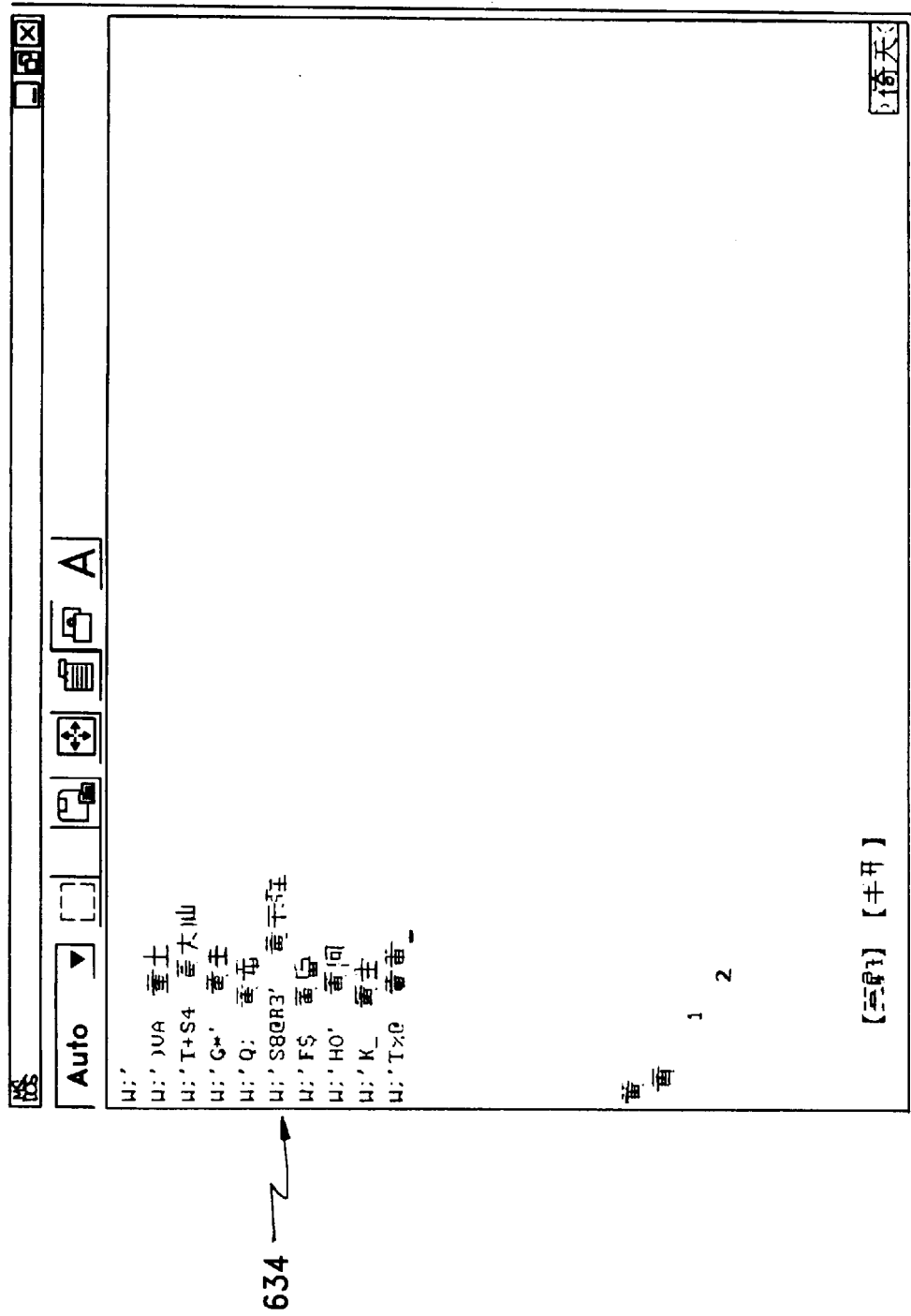

After displaying the translated output file, the user may proofread the output file (step 526). If the user indicates to proofread the output file, the recognizer displays the recognized phrases phonetically as depicted in FIG. 6C (step 528). The user may then read the phrases by reading the corresponding Braille on the output array to determine the size of the recognized phrases. For example, in line 625, three phrases have been recognized as indicated by the spaces. The first phrase is B@MH,LH1KB, the second phrase is K8HHA, and the third phrase is FT"X<'. Once the user determines that a phrase containing numerous characters has been recognized, such as line 624, the user knows that the phrase has more than likely been translated correctly. However, when the user determines that a phrase contains only a single character, like in line 621, the user may examine usages of that character to determine if the correct character was translated. Therefore, the user selects the character (step 629) and the recognizer displays all usages of the character as shown in FIG. 6D (step 530). In FIG. 6D, the phonetics w;' 602 are displayed at the top of the screen followed by various usages 626 of that character in phrases so that the user may determine from the context whether the correct character has been recognized. The recognizer determines the usages by searching the database for all phrases with the character. If the user determines that the incorrect character was recognized, the user may indicate to replace the character (step 531).

If the user chooses to replace the character, the recognizer displays all phonetically-equivalent characters and their usages (step 532). FIGS. 6E–6H contain the entire list 626–632 of all phonetically-equivalent characters and their usages. That is, this list contains all phrases having multiple characters where one of the characters is a wong-sounding character. After displaying this list, the user reads the list and chooses the phrase that contains the intended character (step 534). After choosing the intended character, the recognizer displays the usages of the intended character as shown in FIG. 6I so that the user may verify that the character chosen is the intended character (step 536). If the user believes that the character chosen is the intended character, the user may indicate that the character should be replaced. Upon receiving such an indication, the recognizer will store the intended character into the output file and store the entire phrase, if the character was part of a multi-character phrase, into the database with the corresponding computer representation of the Braille input (step 537). The recognizer stores the entire phrase in the database so that the next time a translation occurs with this input, a correct translation may occur. Next, the recognizer determines if the user wants to perform more proofreading (step 538). If the user wants to perform more proofreading, processing continues to step 528. However, if the user has finished proofreading, processing continues to step 540 in FIG. 5C.

Figure 6J:
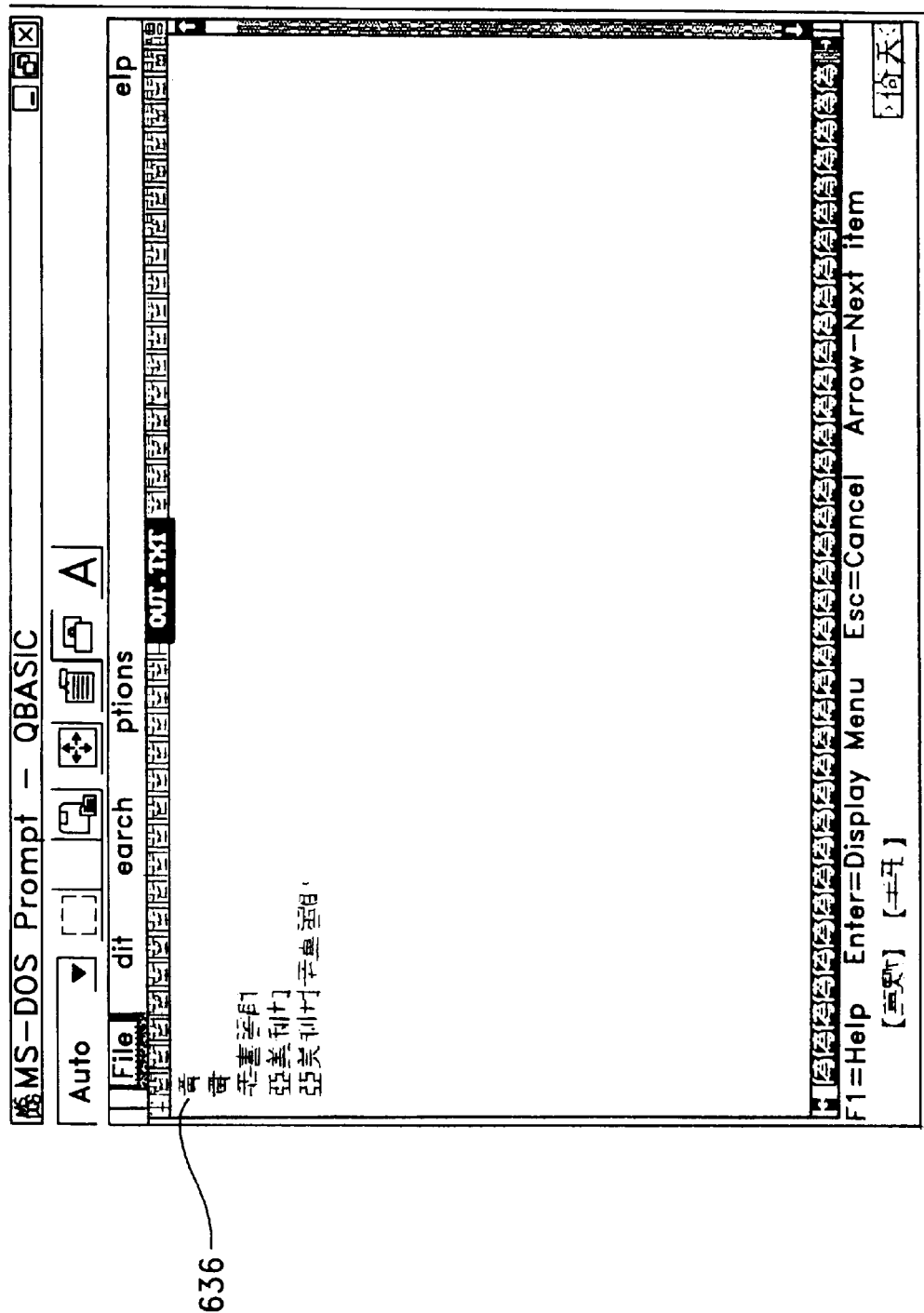
FIG. 6J depicts a corrected output file displayed by the recognizer program.
Figure 6K:
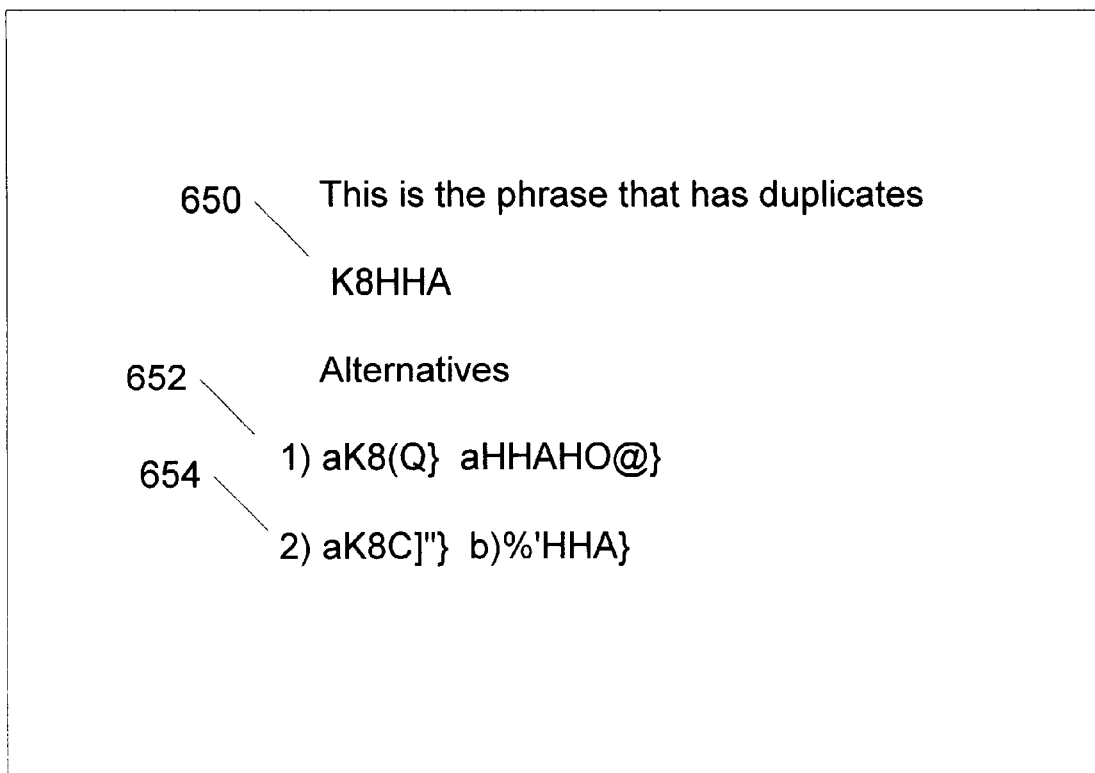
FIG. 6K depicts alternative phrases displayed by the recognizer program.

When the user has completed proofreading, the system displays the corrected output file as shown in FIG. 6J (step 540). As can be seen in FIG. 6J, the wong-sounding character 636 has been changed to the intended character. When performing the proofreading, the user may have noticed a special character (e.g., z) indicating that there were additional matches made in the database for a particular phrase (step 542). If the user noticed that there was such an indication in the output file, the user can instruct the recognizer to display the additional matching entries so that the user can verify that the correct entry for the phrase was chosen (step 544). FIG. 6K depicts a phrase 650 that has two matching entries (alternatives) 652 and 654 in the database. Each character of the alternatives 652 and 654 is displayed in a phrase so that the user can unambiguously determine the character of the alternative phrase. The special characters "a" are used to indicate which of the phonetics represent the character of the alternative phrase and which of the phonetics are used for context. After displaying the alternatives, the user selects an alternative (step 546), the system stores the alternative into the output file (step 548) and the system displays the updated output file. After displaying the output file, processing ends.

While the present invention has been described with reference to a preferred embodiment thereof, those skilled in the art will know of various changes in form that may be made without departing from the spirit and scope of the claimed invention as defined in the appended claims.

What is claimed is:

1. A method for translating Braille input into characters of a multi-byte language in a computer system having the Braille input and having a database of entries containing mappings of Braille to phrases containing at least one character of the multi-byte language, comprising the steps of:
   attempting to match the Braille input to at least one of the entries in the database to translate the Braille input into the multi-byte language;
   when the Braille input does not match at least one of the entries,
      reducing the Braille input by an amount sufficient to represent a character and attempting to match the reduced Braille input to at least one of the entries in the database; and
      when the reduced Braille input does not match at least one of the entries in the database,
         repeatedly performing said reducing step until the reduced Braille input matches at least one of the entries in the database to translate the reduced Braille input into the multi-byte language.

2. The method of claim 1, further including the step of, after repeatedly performing said reducing step, performing the method on a remainder of the Braille input that has not been matched to complete translation of the Braille input into the multi-byte language.

3. The method of claim 1 wherein the step of reducing includes truncating the amount sufficient to represent a character from an end of the Braille input.

4. The method of claim 1 wherein a portion of the Braille input matches multiple entries in the database, and wherein the Braille input contains a user-specified indication which enables unambiguous translation of the portion by allowing one of the multiple matched entries to be selected.

5. The method of claim 4 wherein the user-specified indication identifies an additional character of the multi-byte language that is not to be translated.

6. The method of claim 1 including creating a translation of the Braille input based on the phrases of the matched database entries.

7. The method of claim 6 including when the Braille input matches multiple entries each indicating a phrase, using the indicated phrase which is most commonly-used for the created translation.

8. The method of claim 6 including when the Braille input matches multiple entries, storing a multi-matching indication in the created translation to indicate that more than one database entry was matched.

9. The method of claim 8 wherein the phrase for only one of the matched entries is included in the created translation, and wherein the multi-matching indication in the created translation can be selected by a user in order to receive indications of the phrases for other of the multiple matched database entries.

10. The method of claim 6 including receiving an indication that a character in the created translation is to be replaced, and replacing the character with an indicated replacement character.

11. The method of claim 10 including creating a new database entry containing a mapping of the Braille input to a phrase including the replacement character.

12. The method of claim 1 including:
   after matching at least a portion of the Braille input to at least one of the entries in the database,
      outputting to a user in a visual manner the phrases for the matched database entries;
      receiving input from the user indicating a character in a selected output phrase;
      outputting in a visual manner usages of the indicated character so that the user can determine if the indicated character is an intended character; and
      when the user determines that the indicated character is not the intended character,
         outputting in a visual manner phonetically-equivalent characters and usages of the phonetically-equivalent characters to allow the user to select the intended character;
      receiving from the user an indication of the intended character;
      replacing the indicated character in the selected phrase with the intended character; and
      storing an entry in the database with the selected phrase containing the intended character and the corresponding Braille input.

13. The method of claim 1 including:
   when the reduced Braille input matches more than one database entry, storing in an output file a multimatching indication with a phrase for one of the matched database entries;
   visually outputting the output file;
   receiving input from the user indicating the phrase with the multimatching indication;
   visually outputting an additional phrase for one of the additional database entries that matched the reduced Braille input so that the user can determine if the additional phrase is an intended phrase;
   receiving from the user an indication to replace the indicated phrase with the additional phrase when the user determines that the additional phrase is the intended phrase; and
   replacing the indicated phrase with the additional phrase.

14. The method of claim 1 including visually outputting on a display at least a portion of the phrase for one of the matched database entries.

15. The method of claim 1 wherein the phrases for the matched database entries are stored, and including:
   outputting in a visual manner the phrases for the matched database entries so that a user can determine whether the phrases were intended by the Braille input; and
   after receiving an indication that one of the output phrases was not intended, replacing the stored indicated output phrase with an indicated intended phrase.

16. The method of claim 1 including:
   after matching at least a portion of the Braille input to at least one of the entries in the database,
      outputting to a user in a tactile manner the phrases for the matched database entries;
      receiving input from the user indicating a character in a selected output phrase;
      outputting in a tactile manner usages of the indicated character so that the user can determine if the indicated character is an intended character; and
      when the user determines that the indicated character is not the intended character,
         outputting in a tactile manner phonetically-equivalent characters and usages of the phonetically-equivalent characters to allow the user to select the intended character;
      receiving from the user an indication of the intended character;
      replacing the indicated character in the selected phrase with the intended character; and
      storing an entry in the database with the selected phrase containing the intended character and the corresponding Braille input.

17. The method of claim 1 including:
   when the reduced Braille input matches more than one database entry, storing in an output file a multimatching indication with a phrase for one of the matched database entries;

tactilely outputting the output file;
receiving input from the user indicating the phrase with the multimatching indication;
tactilely outputting an additional phrase for one of the additional database entries that matched the reduced Braille input so that the user can determine if the additional phrase is an intended phrase;
receiving from the user an indication to replace the indicated phrase with the additional phrase when the user determines that the additional phrase is the intended phrase; and
replacing the indicated phrase with the additional phrase.

18. The method of claim 1 including tactilely outputting at least a portion of the phrase for one of the matched database entries on a Braille output device able to tactilely present information to a visually-impaired user.

19. The method of claim 1 wherein the phrases for the matched database entries are stored, and including:
outputting in a tactile manner the phrases for the matched database entries so that a user can determine whether the phrases were intended by the Braille input; and
after receiving an indication that one of the output phrases was not intended, replacing the stored indicated output phrase with an indicated intended phrase.

20. A computer-readable medium containing instructions for controlling a computer system to translate Braille input into characters of a multi-byte language, the computer system having the Braille input and having a database of entries containing mappings of Braille to phrases containing at least one character of the multi-byte language, by performing the steps of:
attempting to match the Braille input to at least one of the entries in the database to translate the Braille input into the multi-byte language;
when the Braille input does not match at least one of the entries,
reducing the Braille input by an amount sufficient to represent a character and attempting to match the reduced Braille input to at least one of the entries in the database; and
when the reduced Braille input does not match at least one of the entries in the database,
repeatedly performing said reducing step until the reduced Braille input matches at least one of the entries in the database to translate the reduced Braille input into the multi-byte language.

21. The computer-readable medium of claim 20, further including the step of, after repeatedly performing said reducing step, performing the method on a remainder of the Braille input that has not been matched to complete translation of the Braille input into the multi-byte language.

22. The computer-readable medium of claim 20 wherein the step of reducing includes truncating the amount sufficient to represent a character from an end of the Braille input.

23. The computer-readable medium of claim 20 wherein the computer system is further controlled to create a translation of the Braille input based on the phrases of the matched database entries.

24. The computer-readable medium of claim 23 wherein when the Braille input matches multiple entries each indicating a phrase, the indicated phrase which is most commonly-used is included in the translation.

25. The computer-readable medium of claim 23 wherein when the Braille input matches multiple entries, a multimatching indication is stored in the created translation to indicate that more than one database entry was matched.

26. The computer-readable medium of claim 23 wherein the computer system is further controlled to receive an indication that a character in the created translation is to be replaced, and to replace the character with a replacement character.

27. The computer-readable medium of claim 23 wherein the computer system is further controlled to create a new database entry containing a mapping of the Braille input to a phrase including the replacement character.

28. The computer-readable medium of claim 20 wherein the computer system is further controlled by:
after matching at least a portion of the Braille input to at least one of the entries in the database,
outputting to a user in a visual manner the phrases for the matched database entries;
receiving input from the user indicating a character in a selected output phrase;
outputting in a visual manner usages of the indicated character so that the user can determine if the indicated character is an intended character; and
when the user determines that the indicated character is not the intended character,
outputting in a visual manner phonetically-equivalent characters and usages of the phonetically-equivalent characters to allow the user to select the intended character;
receiving from the user an indication of the intended character;
replacing the indicated character in the selected phrase with the intended character; and
storing an entry in the database with the selected phrase containing the intended character and the corresponding Braille input.

29. The computer-readable medium of claim 20 wherein the computer system is further controlled by:
when the reduced Braille input matches more than one database entry, storing in an output file a multimatching indication with a phrase for one of the matched database entries;
visually outputting the output file;
receiving input from the user indicating the phrase with the multimatching indication;
visually outputting an additional phrase for one of the additional database entries that matched the reduced Braille input so that the user can determine if the additional phrase is an intended phrase;
receiving from the user an indication to replace the indicated phrase with the additional phrase when the user determines that the additional phrase is the intended phrase; and
replacing the indicated phrase with the additional phrase.

30. The computer-readable medium of claim 20 wherein the computer system is further controlled to visually output on a display at least a portion of the phrase for one of the matched database entries.

31. The computer-readable medium of claim 20 wherein the computer system is further controlled by:
outputting in a visual manner the phrases for the matched database entries so that a user can determine whether the phrases were intended by the Braille input; and
after receiving an indication that one of the output phrases was not intended, replacing the stored indicated output phrase with an indicated intended phrase.

32. The computer-readable medium of claim 20 wherein the computer system is further controlled by:
after matching at least a portion of the Braille input to at least one of the entries in the database, outputting to a user in a tactile manner the phrases for the matched database entries;

receiving input from the user indicating a character in a selected output phrase;

outputting in a tactile manner usages of the indicated character so that the user can determine if the indicated character is an intended character; and when the user determines that the indicated character is not the intended character, outputting in a tactile manner phonetically-equivalent characters and usages of the phonetically-equivalent characters to allow the user to select the intended character;

receiving from the user an indication of the intended character;

replacing the indicated character in the selected phrase with the intended character; and storing an entry in the database with the selected phrase containing the intended character and the corresponding Braille input.

33. The computer-readable medium of claim 20 wherein the computer system is further controlled by:

when the reduced Braille input matches more than one database entry, storing in an output file a multimatching indication with a phrase for one of the matched database entries;

tactilely outputting the output file;

receiving input from the user indicating the phrase with the multimatching indication;

tactilely outputting an additional phrase for one of the additional database entries that matched the reduced Braille input so that the user can determine if the additional phrase is an intended phrase;

receiving from the user an indication to replace the indicated phrase with the additional phrase when the user determines that the additional phrase is the intended phrase; and replacing the indicated phrase with the additional phrase.

34. The computer-readable medium of claim 20 wherein the computer system is further controlled to tactilely output at least a portion of the phrase for one of the matched database entries on a Braille output device able to tactilely present information to a visually-impaired user.

35. The computer-readable medium of claim 20 wherein the computer system is further controlled by:

outputting in a tactile manner the phrases for the matched database entries so that a user can determine whether the phrases were intended by the Braille input; and after receiving an indication that one of the output phrases was not intended, replacing the stored indicated output phrase with an indicated intended phrase.

36. A method for translating Braille into a multi-byte language in a computer system having a database with entries, each entry containing a mapping of Braille to a phrase comprising at least one character of the multi-byte language, comprising the steps of:

receiving Braille input that phonetically represents a portion of the multi-byte language;

attempting to match the Braille input to at least one database entry in order to translate the Braille input;

when the Braille input does not match at least one database entry, repeatedly truncating from the end of the Braille input an amount sufficient to represent a character and attempting to match the truncated Braille input to at least one database entry, the truncating and the attempting to match of the truncated Braille input continuing until the truncated Braille input matches at least one database entry;

storing the phrase from the matched database entry into an output file in a manner such that the phrase is distinguished from other phrases in the output file;

receiving an indication from a user of an incorrect character in the output file;

replacing the incorrect character in the output file with an indicated correct character; and storing an entry in the database containing a mapping of the Braille input corresponding to the correct character to a phrase containing the correct character.

37. A method in a computer system for translating portions of Braille input from a user into characters of a multi-byte language, one of the portions of the Braille input corresponding to a plurality of the characters although the user intends only a single intended character to be identified by the one portion, comprising the steps of:

(a) receiving the Braille input for translation into the multi-byte language, the input containing a user-specified indication of the one portion;

(b) utilizing the user-specified indication to unambiguously translate the one portion into the single intended character; and (c) before the utilizing of the user-specified indication:

for each portion of the Braille input, attempting to match the portion to characters of the multi-byte language;

when a portion is matched to a plurality of characters, determining whether a user-specified indication is available for the portion, and when it is determined for the one portion that a user-specified indication is available, performing step (b) to unambiguously translate the one portion into the single intended character; and when a portion is not matched to any characters, repeatedly truncating from the end of the portion an amount sufficient to represent a character and attempting to match the truncated portion to at least one character, the truncating and the attempting to match of the truncated portion continuing until the truncated portion matches at least one character.

38. The method of claim 37, wherein the Braille input specifies phonetic characteristics of the characters of the multi-byte language.

39. The method of claim 37, wherein the user-specified indication provides usage information for the intended character.

40. A method in a computer system for translating Braille input representing phonic data for a multi-byte language into text of the language, the phonic data representing spoken sounds of the language, the computer system having a database with entries containing mappings of phonic data onto phrases of the text, comprising the steps of:

receiving portions of the phonic data;

translating the received portions of the phonic data into text by mapping the received portions to the phrases in the database entries; and when a portion of the phonic data does not match at least one database entry, repeatedly truncating from the end of the portion an amount sufficient to represent a character and attempting to match the truncated portion to at least one database entry, the truncating and the attempting to match of the truncated portion continuing until the truncated portion matches at least one database entry.

* * * * *